Jan. 24, 1961
R. E. SEARS
2,969,222
NO-BACK ARRANGEMENT FOR BALL SCREWS
Filed Aug. 23, 1957
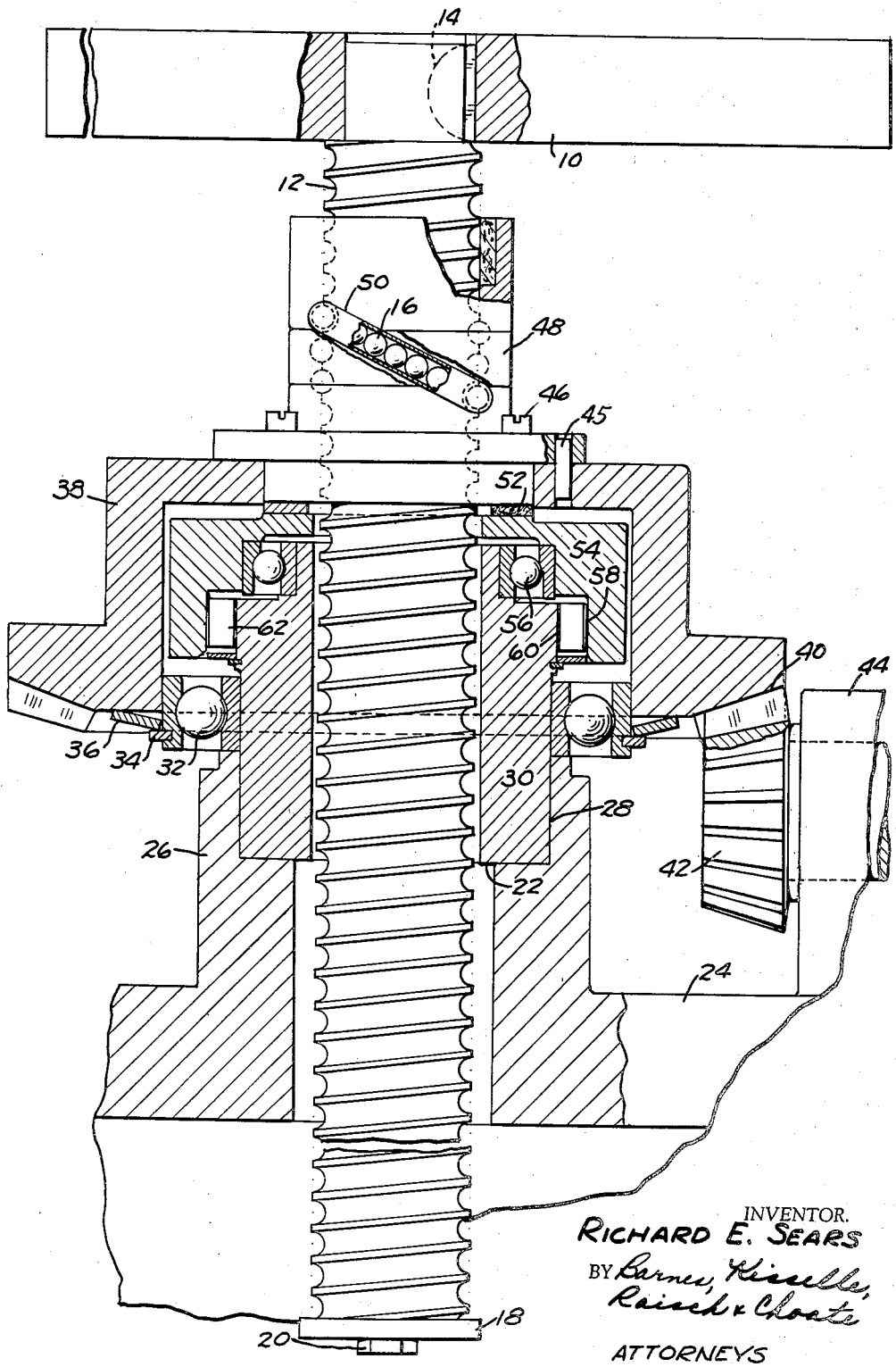
INVENTOR.
RICHARD E. SEARS
BY Barnes, Kisselle,
Raisch & Choate
ATTORNEYS വ
United States Patent Office 2,969,222
Patented Jan. 24, 1961

2,969,222

NO-BACK ARRANGEMENT FOR BALL SCREWS

Richard E. Sears, Birmingham, Mich., assignor to Beaver Precision Products, Inc., Clawson, Mich., a corporation of Michigan Filed Aug. 23, 1957, Ser. No. 679,972

17 Claims. (Cl. 254—103)

This invention relates to screw jacks for producing, by rotation of an input member, a translatory motion of an output member against a resisting thrust. Where such devices are used to overcome a thrust which acts always in one direction, a self-locking type of mechanism involves the use of screws or worms which are inherently less than 50% efficient. On the other hand, where more efficient screw mechanisms are utilized, such as the re-circulating ball type of screw and nut mechanism, the resisting thrust reacts upon the input member to produce reversibility, that is, the resisting thrust or the load produces reverse torque which aids in driving the input member. Thus, in the case of re-circulating ball type screw jacks, where the load has energy of position due to its mass or energy of inertia, a force continues to exist after motion has ceased. In such arrangements, it is customary to incorporate means, commonly referred to as a "no-back" mechanism, to prevent the load from driving the screw.

It is an object of the present invention to provide a "no-back" arrangement of the friction type for screw jack mechanisms of the re-circulating ball type wherein the friction generated that is effective to prevent reversibility can be controlled to within a desired range of values whereby the torque required to move the load in the load assisted direction may be varied to suit the conditions. In some instances, it may be desired to equalize the torque input requirements for either direction of rotation of the input member and in other instances, it may be desired to generate only sufficient friction at the "no-back" surface to overcome the torque generated by the load.

Further objects and advantages of the present invention will be apparent from the following description, reference being had to the accompanying drawing wherein a preferred form of the present invention is illustrated.

In the drawings:

The single figure represents a cross sectional view of a screw jack incorporating a preferred form of the present invention.

In the drawings, there is shown a screw jack device which may be used for raising and lowering a gravity load such, for example, as a work table 10 of a machine tool such as a milling machine or drill press. It will be understood that this is representative of but one of the many types of load devices which may be operated by a screw jack and which imposes a unidirectional resistance either of constant or varying magnitude. The table 10 is provided with independent ways, not illustrated.

The screw jack comprises a threaded shaft or screw 12 which is non-rotatably associated with the table 10 by means of a key 14 and is provided with a thread of suitable form for receiving re-circulating balls 16. A stop plate 18 is secured to the bottom of the screw 12 by a bolt 20 for the purpose of limiting the upward motion of the screw by contact with a shoulder 22.

At 24, there is illustrated a portion of the main support structure for the jack which may comprise the base of a machine tool, for example, and which has an upstanding annular spud 26. Pressed into a counterbore 28 of the spud 26 is a stationary supporting tube 30 which may be formed of hardened steel or other durable material. The spud 26 supports at its upper end a ball thrust bearing 32 having a load receiving snap ring 34 on its outer race. Resting upon the ring 34 is a Belleville spring 36 which in turn supports a cup-shaped rotary driving member 38 having a bevel gear 40 formed upon its outer periphery.

A bevel gear 42 is journalled in an upstanding bracket 44 to mesh with the bevel gear 40 for the purpose of driving the latter. The gear 42 may be driven by any desired power or manual arrangement, not shown. It will be understood that the bevel gears illustrate but one form of gearing suitable for providing a rotary drive to the member 38.

Mounted on top of the member 38, by means of a dowel pin 45 and screws 46, is a ball bearing nut assembly generally designated 48 having one or more ball return tubes 50 for the purpose or re-circulating the balls 16 between the screw 12 and the nut 48 in the conventional manner.

The mechanism for compensating for the difference between the raising torque and the lowering torque comprises a friction ring 52 secured to the lower face of the nut assembly 48. This is frictionally in contact with the top surface of an intermediate member 54 which is supported upon the tube 30 by means of an anti-friction thrust bearing 56.

The intermediate member 54 has a cylindrical counterbore 58 which surrounds a cylindrical surface 60 formed upon the tube 30. A suitable sprag type clutch 62 is arranged between surfaces 58 and 60 to act as a lock against rotation of member 54 in the lowering direction while permitting free rotation thereof in a raising direction. The construction of the sprag mechanism may be of any desired type and forms, per se, no part of the present invention.

In operation, the load 10 may be raised or lowered by rotating the gear 42 which in turn rotates the input member comprising cup 38 and the nut 48. Since the screw 12 is keyed to the load 10 and cannot rotate, the screw 12 is threaded upwardly by the rotation of nut 48, balls 16 re-circulating through the tube 50. When the input member is rotated in the direction to raise the load 10 against the downward thrust of gravity, the friction ring 52 drives the intermediate member 54 with it and the sprag clutch 62 permits rotation freely in this direction.

The load of the table 10 is transmitted to the base 24 by two paths. The first is through the friction ring 52, the intermediate member 54, the thrust bearing 56, and tube 30 to the base 24. The second path is from the base of the input member 38, through the Belleville spring 36, ring 34, and thrust bearing 32 to the top of the spud 26.

When it is desired to lower the table 10, the gear 42 is rotated in the reverse direction, causing the nut 48 to thread the screw 12 downwardly. Because of the inherent efficiency of the re-circulating ball construction and of the gearing 40 and 42, the downward gravity thrust would be able to drive the mechanism backwards or at least would greatly reduce the amount of torque required to lower the load.

Because of the "no-back" mechanism, however, frictional torque is introduced, which may be proportioned in accordance with the amount of thrust load being applied. Thus, the friction ring 52 tends to drive the intermediate member 54 in a reverse direction. This is prevented, however, by the sprag clutch 62 which locks the intermediate member 54 to the stationary tube 30. By proper designing of the Belleville spring 36, a portion of the gravity thrust may be directly supported on the spud 26 through thrust bearing 32. It is preferred to utilize the relatively flat mid-portion of the force-deflection curve of the Belleville spring, and to support thereby a relatively constant amount of the total thrust exerted by the table 10. The remaining thrust is supported by the friction ring 52 through members 54 and 56. The torque required to overcome the friction between ring 52 and the member 54 is proportional to the difference between the jack load and the portion of the load carried by the Belleville spring. This latter portion of the load does not contribute any friction beyond the losses in bearing 32. By properly proportioning the Belleville spring 36, and with reasonable values of axial tolerance in the other parts, it is possible to provide a mechanism which introduces at the friction surface an amount of drag which closely approximates the torque required to raise the load or even an amount just sufficient to resist the torque generated by the load.

The invention here is not limited, of course, to arrangements where the ball nut is rotated. The "no-back" mechanism is equally adapted to arrangements where the screw, as distinguished from the nut, is rotated, or where a differential action is obtained by rotating both the screw and the nut.

It will also be appreciated that the use of a Belleville spring is not strictly necessary. Most any resilient means such as ordinary springs, pneumatic cushioning, etc. may be employed. However, because of the non-linear force-deflection curve of a Belleville spring, such a spring is preferred. It will support a constant load over a wide range of deflection. This in turn enables a greater tolerance on parts of the assembly and also permits substantial wear on the friction washer 52 without affecting the load supported by the spring.

It will be appreciated that with an arrangement such as described where the ball nut rotates rather than the screw, the minimum radius of a friction washer employed to overcome the thrust load must naturally exceed the outer diameter of the screw. With a friction washer of this minimum size and with normal intermetallic friction coefficients, the use of a friction washer alone would be unsuitable because the lowering torque would be so much greater than the raising torque. Thus, the use of a spring such as shown at 36 produces a very desired result. However, in the arrangement described, the minimum thrust load must substantially exceed the force at which the spring takes all the load off the friction washer.

It will thus be seen that the present invention provides an improved screw jack in which an efficient screw and nut mechanism may be utilized as well as efficient driving gear and yet one in which reverse thrust or torque transmission is prevented. Furthermore, the present invention provides for such a device wherein the driving torque may be approximately equal for both raising and lowering operations or where the lowering torque may be considerably less than the raising torque, while at the same time obtaining the maximum efficiency for load raising purposes. This is brought about by reason of introducing the holding or braking torque only upon a tendency for reverse motion under load, but eliminating this torque whenever raising operation takes place.

While the form of embodiment of the invention as herein disclosed constitutes a preferred form, it is to be understood that other forms might be adopted, all coming within the scope of the claims which follow.

I claim:

1. A screw jack subject to unidirectional thrust load comprising a screw and nut, one of which comprises a rotatable input member rotatable about the axis of the thrust load and the other comprises a translatable output member translatable along the axis of the thrust load, a series of bearing balls disposed between and interconnecting the screw and nut, means for driving the input member in either direction of rotation, a stationary member positioned to receive said thrust load and against which the input member bears axially, a connection between the input member and the stationary member for resisting rotation of the input member in the direction as induced by the thrust load on the output member, said connection including a frictional element interposed axially between the input member and the stationary member and means for reducing the frictional effect of said frictional element comprising a resilient support for supporting the input member from the stationary member independently of said frictional connection.

2. The combination called for in claim 1 wherein said frictional connection includes an overrunning clutch.

3. The combination called for in claim 1 wherein said frictional connection includes a rotatable member supported for rotation on said stationary member, said last mentioned rotatable member bearing axially against the input member, said friction element being interposed therebetween and tending to cause said input member and last mentioned rotatable member to rotate as a unit and a one-way clutch acting between the last-mentioned rotatable member and the stationary member, said clutch preventing rotation of the last mentioned rotatable member induced by the thrust load on the output member and permitting free rotation in the opposite direction.

4. The combination called for in claim 3 wherein said resilient support comprises a Belleville spring.

5. The combination called for in claim 3 wherein said resilient support is designed such that the frictional drag produced by the friction element is slightly in excess of the torque generated by the thrust load on the output member.

6. The combination called for in claim 3 wherein said resilient support is designed such that the frictional drag produced by the friction element exceeds the torque generated by the thrust load on the output member by an amount such that the torque required for rotating the input member in opposite directions is substantially the same.

7. A screw jack subject to unidirectional thrust comprising a screw and nut, one of which comprises a rotatable input member rotatable about the axis of the thrust load and the other comprises a translatable output member translatable along the axis of the thrust load, a series of bearing balls disposed between and interconnecting the screw and nut, means for driving the input member in either direction of rotation and means for preventing the thrust load on the output member from rotating the input member comprising a stationary element, an intermediate element connected to the stationary element for free rotation in one direction but locked against rotation in the opposite direction, a friction element interposed axially between said input member and said intermediate member, said input member bearing axially against said intermediate member through said friction element by reason of the thrust load on the output member and resilient means for relieving the friction element of a portion of the thrust load.

8. A screw jack subject to unidirectional thrust comprising a screw and nut, one of which comprises a rotatable input member rotatable about the axis of the thrust load and the other comprises a translatable output member translatable along the axis of the thrust load, a series of bearing balls disposed between and interconnecting the screw and nut, means for driving the input member in either direction of rotation and means for preventing the thrust load on the output member from rotating the input member comprising a stationary element, an anti-friction thrust bearing supported on the stationary element, an intermediate element mounted for rotation on the thrust bearing, a one-way clutch between said elements, means for imposing frictional drag between the input member and the intermediate element in an amount responsive to the thrust load on the output element and resilient means for transmitting a portion of the thrust load to the stationary element independently of said thrust bearing.

9. The combination called for in claim 8 including a second anti-friction thrust bearing mounted on the stationary element, said resilient means acting between said second anti-friction thrust bearing and the input element.

10. A screw jack subject to unidirectional thrust comprising a screw and nut, one of which comprises a rotatable input member rotatable about the axis of the thrust load and the other comprises a translatable output member translatable along the axis of the thrust load, a series of bearing balls disposed between and interconnecting the screw and nut, means for driving the input member in either direction of rotation and means for preventing axial thrust on the output member from rotating the input member comprising a stationary element positioned to receive the thrust load, a rotatable element on said stationary element freely rotatable in one direction and locked against rotation in the opposite direction, said rotatable element being in axial bearing relation to said input member whereby the axial thrust load on the output member is borne by said rotatable element, a friction element interposed axially between said input member and said rotatable element and tending to prevent relative rotation therebetween to an extent varying with the thrust load and yieldable means for transmitting a portion of the thrust load from the output member to the stationary element independently of said rotatable element and thereby diminish the frictional drag between the input member and the rotatable element.

11. The combination called for in claim 10 wherein said input member comprises the nut and said output member comprises the screw of said mechanism, said friction element extending circumferentially around the screw.

12. The combination called for in claim 11 wherein said yieldable means comprises a Belleville spring.

13. In a machine tool having a vertically adjustable table, means for raising and lowering the table comprising a screw and nut, one of which comprises a rotatable input member and the other comprises a vertically shiftable output member which supports the table, a series of bearing balls disposed between and interconnecting the screw and nut, a stationary support for the input member, a frictional connection between the input member and the support, said connection including a friction element interposed axially between the input member and the support and tending to prevent rotation of the input member in a direction to lower the table to a degree varying with the thrust load of the table and yieldable means supporting the input member on the stationary support independently of said frictional connection, said yieldable means serving to reduce the frictional drag of said friction element on said input member whereby to reduce the torque that would otherwise be required to rotate the input member in the table lowering direction.

14. The combination called for in claim 13 wherein the rotatable member comprises the nut and the vertically shiftable member comprises the screw of said mechanism.

15. The combination called for in claim 14 wherein the yieldable means comprises a Belleville spring.

16. In a machine tool having a vertically adjustable table, means for raising and lowering the table comprising a screw and nut, one of which comprises a rotatable input member and the other comprises a vertically shiftable output member which supports the table, a series of bearing balls disposed between and interconnecting the screw and nut, a stationary support element for the input member, an anti-friction thrust bearing on said support, an intermediate element mounted for rotation on said thrust bearing, a one-way clutch between said stationary support element and said intermediate element, said intermediate element being in axial bearing relation to said input member, there being a friction thrust bearing interposed axially therebetween and resilient means for transmitting a portion of the thrust load on the output member to the stationary element independently of said friction thrust bearing.

17. In a machine tool having a vertically adjustable table, means for raising and lowering the table comprising a screw and nut, one of which comprises a rotatable input member and the other comprises a vertically shiftable output member which supports the table, a series of bearing balls disposed between and interconnecting the screw and nut, a stationary support element for the input member, an anti-friction thrust bearing on said support, an intermediate element mounted for rotation on said thrust bearing, a one-way clutch between said stationary support element and said intermediate element, said intermediate element being in axial bearing relation to said input member, there being a friction thrust bearing interposed axially therebetween, a second anti-friction thrust bearing mounted on the stationary element and resilient means connected between the second anti-friction thrust bearing and the input member for supporting a portion of the thrust load on the output member independently of the first thrust bearing and the friction thrust bearing.

References Cited in the file of this patent

UNITED STATES PATENTS

| | | |
|---|---|---|
| 2,166,106 | Gormley | July 18, 1939 |
| 2,567,035 | Setka | Sept. 4, 1951 |
| 2,609,178 | Kearful et al. | Sept. 2, 1952 |
| 2,636,515 | Morey | Apr. 28, 1953 |
| 2,738,684 | Shafer | Mar. 20, 1956 |
| 2,756,964 | Hogan | July 31, 1956 |